Sept. 26, 1950     A. T. CHERRY     2,523,356
FISHING ROD AND REEL HOLDER

Filed Aug. 7, 1946

INVENTOR.
Albert T. Cherry
BY
Brown, Critchlow, Flick & Peckham,
his ATTORNEYS.

Patented Sept. 26, 1950

2,523,356

UNITED STATES PATENT OFFICE 2,523,356

FISHING ROD AND REEL HOLDER

Albert T. Cherry, Pittsburgh, Pa.

Application August 7, 1946, Serial No. 688,947

2 Claims. (Cl. 43—21.2)

This invention relates to new and useful improvements in fishing rod and reel holder.

The fishing rods for which this holder is adapted are of the standard type comprising a flexible, sectional rod which is attached to a handle or butt end, and which has a reel mounted on the handle by any of the usual means. The reels contemplated also are standardized types, such as the Pfleuger, Shakespeare or South Bend, which comprise a case or frame, a crank, pinion and gear attachments of the crank to a winding spool, a click and click wheel, level wind mechanism and other related improvements.

The prior holders of which I am aware are relatively complex and difficult to manufacture as well as to assemble and disassemble when their use is desired. Such holders have the further disadvantages of either so clamping the rod that the pole is difficult to remove quickly from the holder when such removal is desired, or holding it so loosely that it is possible for a fish to dislodge the pole and run away with it.

It is an object of this invention to provide an inexpensive, simply constructed holder which is small and easy to transport and which provides a secure hold on the fishing rod and yet permits its quick removal when desired.

Figure 1:
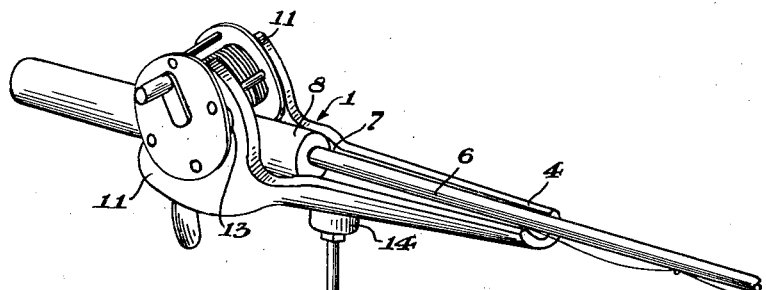
Figure 2:
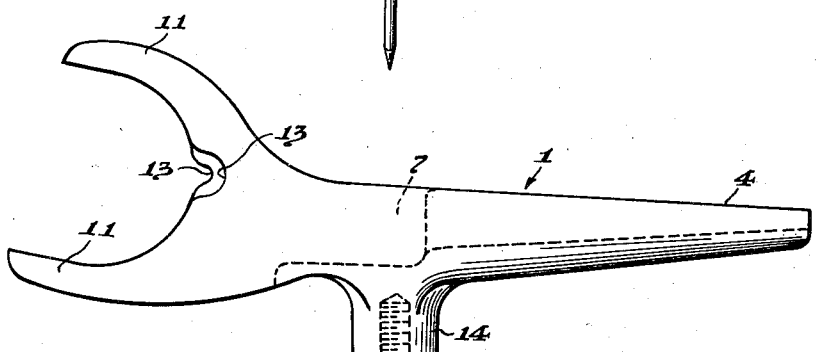
Figure 3:
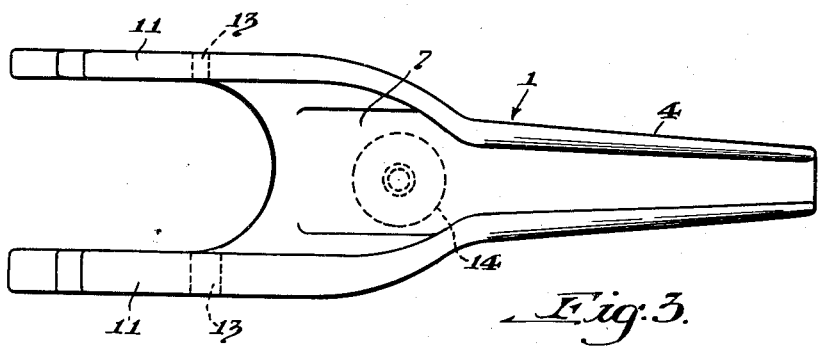

The preferred embodiment of the invention is illustrated in the accompanying drawings of which Fig. 1 is a perspective view of the holder and the fishing rod; Fig. 2 is a right-hand side view of the holder; and Fig. 3 is a top view.

Referring to the drawings, a holder 1 is cast from a single piece of light metal, such as aluminum, or, if desired, it can be constructed of wood, plastic or the like. It comprises a front, relatively long portion 4 which is grooved longitudinally to receive and support a portion of the rear section of a fishing rod 6. The groove tapers outwardly as it proceeds from the front of the holder toward its rear, and opens into a pocket 7 provided in the central portion of the holder. Pocket 7 is sized and shaped to receive and support the forward end 8 of the handle or butt section of the fishing rod. The specific measurements of these portions of the holder are not critical, provided they are large enough to receive their corresponding portions of standard fishing rods.

It is a feature of this holder that it not only supports the rod and forward portion of the butt but also that it holds and supports the reel and the rod. Thus, immediately to the rear of pocket 7 the holder is provided with a pair of outwardly and rearwardly extending prong arms 11 which have arcuate rearwardly facing surfaces 12 adapted to conform to the contour of the case or frame portions of standard reels, such as those mentioned above. Accordingly, since in the usual reels the right-hand casing is wider than the left-hand casing to accommodate the cranking pinions and gears as well as other mechanism necessary for reeling, the right-hand arms of the holder are made correspondingly wider than its left-hand ones. Further, since many reels are provided with level wind mechanism, which extends forwardly of the outer periphery of the reel casing, each pair of reel holding arms 11 is provided with a central notch 13 into which such mechanism fits. As shown in Fig. 1, the lower prongs of the pair of arms extend rearwardly a sufficient distance to provide a cup-like support for the lower portion of the reel while the upper prongs extend upwardly and rearwardly sufficiently to firmly hold a substantial portion of the upper periphery of the reel.

Another feature of this invention is the manner in which the holder is supported in its operative position. A spike 12 is provided having a pointed lower and a threaded upper end which is received in a threaded opening of a lug 14 centrally disposed on the bottom of the holder. In use, in order to support the holder the spike can be forced solidly into the ground or, as the case may be, slipped into the gunwale of a boat. As is known, the balance point of most fishing rods lies a short distance in front of the reel, and, with regard to this fact, the balance point of the holder is located approximately in line with that of the rod, and spike-receiving lug 14 is positioned on the holder in vertical alignment with these balance points. Thus, when the spike and holder are assembled, and the spike forced into the ground, the rod can be placed in the holder and it will substantially balance therein.

It is desirable when leaving the rod in the holder to set the reel click so that any strike immediately will be known to the fisherman. As is apparent he then can quickly remove the rod from the holder for manual use. However, the holder is so formed that, even though the rod is not immediately removed from it, the rod will be retained securely in the holder. A considerable amount of the force which is exerted on the rod when a fish strikes is in a forward direction, and this force is counteracted effectively by the abutment of the arms of the holder on the reel of the rod. The downward force, which would tend to tip the pole out of the holder, is counteracted by the upper prongs of arms 11 so that a striking and running fish will be unable to dislodge the rod from the holder and run away with it. When the use of the holder is no longer desired, it can be disassembled easily and quickly and packed in a small amount of space for transporting.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A fishing rod and reel holder comprising an elongate forward portion provided with a longitudinal groove shaped to receive and support a length of the rear portion of the rod of a pole, said groove opening into a pocket provided in the central portion of the holder, the pocket being wider and deeper than said groove and being shaped to receive the forward end of the pole's handle section, arcuate prong arms extending outwardly and rearwardly from the sides of said central portion and having rearwardly facing surfaces shaped to conform to and receive and hold the front peripheral surface of a reel, whereby said holder is capable of securely supporting a pole in a quickly and easily removable manner, and means to support the holder in operative position.

2. A fishing rod and reel holder comprising an elongate forward portion provided with a longitudinal groove shaped to receive and support the rear portion of the rod of a pole, said groove opening into a pocket provided in the central portion of the holder, the pocket being wider and deeper than said groove and being shaped to receive the forward end of the pole's handle section, arcuate prong arms extending outwardly and rearwardly from the sides of said central portion and having rearwardly facing surfaces shaped to conform to and receive and hold the front peripheral surface of a reel, whereby said holder is adapted to securely support a pole in a quickly and easily removable manner, and a spike detachably connected to said holder at its balance point to support the holder in operative position.

ALBERT T. CHERRY.

REFERENCES CITED

The following references are of record in the file of this patent:

UNITED STATES PATENTS

| Number | Name | Date |
|---|---|---|
| 2,249,302 | Smith | July 15, 1941 |
| 2,293,305 | Oldham | Aug. 18, 1942 |
| 2,311,823 | Gaskill | Feb. 23, 1943 |
| 2,314,747 | White | Mar. 23, 1943 |